(12) United States Patent
Zenner et al.

(10) Patent No.: US 10,899,248 B2
(45) Date of Patent: Jan. 26, 2021

(54) ASSEMBLY AND METHOD FOR COOLING A TRACTION BATTERY OF A VEHICLE USING AT LEAST ONE COOLING RIB

(71) Applicant: Ford Global Technologies, LLC, Dearborn, MI (US)

(72) Inventors: Thomas Zenner, Dueren (DE); Daniel Kok, Ann Arbor, MI (US); Caroline Born, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/254,751

(22) Filed: Jan. 23, 2019

(65) Prior Publication Data

US 2019/0225111 A1 Jul. 25, 2019

(30) Foreign Application Priority Data

Jan. 24, 2018 (DE) .......................... 10 2018 201116

(51) Int. Cl.
*B60K 1/00* (2006.01)
*B60L 58/26* (2019.01)
(Continued)

(52) U.S. Cl.
CPC ................ *B60L 58/26* (2019.02); *B60K 1/00* (2013.01); *B60K 6/28* (2013.01); *B60K 15/03* (2013.01); *B60L 50/66* (2019.02); *H01M 10/613* (2015.04); *H01M 10/625* (2015.04); *H01M 10/653* (2015.04); *H01M 10/6554* (2015.04); *H01M 10/66* (2015.04); *B60K 2001/005* (2013.01); *B60K 2001/0433* (2013.01); *B60K 2015/03328* (2013.01); *B60K 2015/03427* (2013.01); *B60K 2015/03486* (2013.01);
(Continued)

(58) Field of Classification Search
CPC ............ B60K 15/03177; B60K 15/077; B60K 15/03; B60K 15/067
See application file for complete search history.

(56) References Cited

U.S. PATENT DOCUMENTS 2,144,945 A * 1/1939 Sutton .................... B64D 37/02
220/651
2,982,441 A * 5/1961 Farrell .................... F17C 3/025
220/652
(Continued)

FOREIGN PATENT DOCUMENTS

JP 2007302123 11/2007
JP 2007320331 12/2007

*Primary Examiner* — Hau V Phan
(74) *Attorney, Agent, or Firm* — David Kelley, Esq.; Carlson, Gaskey & Olds, P.C.

(57) ABSTRACT

The disclosure relates to an assembly that cools a traction battery of a vehicle, in particular a hybrid electric vehicle. The assembly can include at least one fuel tank and at least one traction battery that is arranged outside the fuel tank and is thermally connected to the fuel tank. The assembly can further include at least one cooling rib that is arranged inside the fuel tank. The cooling rib can be thermally connected to a connection portion of the fuel tank, which is thermally connected to the traction battery and is constructed in such a manner that it extends almost completely or completely as far as a base wall portion of the fuel tank. The fuel tank can be arranged to be lower than the connection portion.

20 Claims, 6 Drawing Sheets

(51) Int. Cl.
  *B60K 6/28*      (2007.10)
  *B60K 15/03*     (2006.01)
  *H01M 10/625*    (2014.01)
  *H01M 10/613*    (2014.01)
  *H01M 10/66*     (2014.01)
  *H01M 10/653*    (2014.01)
  *H01M 10/6554*   (2014.01)
  *B60L 50/60*     (2019.01)
  *B60K 1/04*      (2019.01)

(52) U.S. Cl.
  CPC ....... *B60Y 2200/91* (2013.01); *B60Y 2200/92* (2013.01); *B60Y 2306/05* (2013.01); *H01M 2220/20* (2013.01)

(56) References Cited

U.S. PATENT DOCUMENTS

| | | | | |
|---|---|---|---|---|
| 3,221,916 A * | 12/1965 | Rysgaard | ............... | F17C 3/005 220/560.06 |
| 4,518,091 A * | 5/1985 | Scheurenbrand | ...... | B60K 15/03 220/4.14 |
| 4,611,724 A * | 9/1986 | Watkins | ................. | B60P 3/221 220/553 |
| 5,020,687 A * | 6/1991 | Seizert | .................... | B29C 49/20 220/560.01 |
| 5,398,839 A * | 3/1995 | Kleyn | ............. | B60K 15/03177 220/4.14 |
| 6,186,225 B1 * | 2/2001 | Higgins | ................ | B21D 28/28 165/173 |
| 6,957,542 B1 * | 10/2005 | Kido | .................... | F02M 25/089 123/519 |
| 8,047,395 B2 * | 11/2011 | Allidieres | ................ | F17C 3/08 220/560.11 |
| 8,393,426 B2 * | 3/2013 | Takahashi | ................ | B60K 1/04 180/68.5 |
| 8,636,162 B2 * | 1/2014 | Schoen | .................. | B60K 15/03 220/4.14 |
| 8,720,732 B2 * | 5/2014 | Criel | ................. | B60K 15/03 220/4.14 |
| 8,800,505 B2 * | 8/2014 | Ichihashi | ................. | F01P 1/02 123/41.7 |
| 9,321,347 B2 * | 4/2016 | Cragel | ................ | B60K 15/077 |
| 2002/0011271 A1 * | 1/2002 | Taurel | ............. | B60K 15/03177 137/565.24 |
| 2003/0015537 A1 * | 1/2003 | Konja | ................. | B60K 15/077 220/563 |
| 2014/0246259 A1 | 9/2014 | Yamamura et al. | | |
| 2015/0035267 A1 * | 2/2015 | Shipp | ................... | B60K 15/067 280/834 |
| 2016/0023689 A1 * | 1/2016 | Berger | .................... | B60L 58/26 180/65.23 |
| 2017/0106744 A1 * | 4/2017 | Ajisaka | ..................... | B60K 1/04 |
| 2017/0106907 A1 * | 4/2017 | Gong | ...................... | B60R 19/20 |

* cited by examiner

ASSEMBLY AND METHOD FOR COOLING A TRACTION BATTERY OF A VEHICLE USING AT LEAST ONE COOLING RIB

CROSS-REFERENCE TO RELATED APPLICATIONS

This application claims priority to German Patent Application No. 102018201116.8, which was filed on 24 Jan. 2018 and is incorporated herein by reference in its entirety.

TECHNICAL FIELD

This disclosure relates generally to cooling of a traction battery and, more particularly, to cooling using at least one cooling rib arranged inside a fuel tank.

BACKGROUND

Hybrid electric vehicles have at least one traction battery, by means of which, during electric drive mode of the hybrid electric vehicle, electrical drive devices of the hybrid electric vehicle can be supplied with electrical energy. The traction battery can be arranged in the hybrid electric vehicle in such a manner that the passenger compartment and the storage space of the hybrid electric vehicle are limited to the smallest possible extent or not at all. To this end, the traction battery is, for example, constructed as an underfloor unit, in particular below the rear bench type seat and at the front side with respect to the rear axle of the hybrid electric vehicle. In this instance, the traction battery shares a structural space with the fuel tank of the hybrid electric vehicle, which leads to a reduced tank volume.

An arrangement of the traction battery close to other components of the hybrid electric vehicle may make the required cooling of the traction battery more difficult, for example, when surfaces of the traction battery cannot be subjected to a cooling air flow. This can lead to poor heat discharge from the traction battery and consequently to higher operating temperatures of the traction battery and the battery cells thereof, which can lead to a reduction of the battery power and/or the battery service-life.

JP 2007 302 123 A discloses a motor vehicle having a battery which is arranged adjacent to a fuel tank so that, in order to cool the battery, heat of the battery can be transferred to fuel in the fuel tank. An electronic control system decides on the basis of the temperature of the battery whether it is necessary to cool the battery or not. If it is necessary to cool the battery, the electronic control system controls an electromagnetic valve so that at least a portion of the fuel discharged from the fuel tank can be returned to the fuel tank through a return line. If the fuel circulates over this path, the fuel loses heat, whereby a heat exchange between the battery and the fuel is brought about.

JP 2007 320 331 A discloses a hybrid electric vehicle having a battery which is immersed in a liquid fuel inside a fuel tank. The battery can be cooled by a coldness of the fuel. When the hybrid electric vehicle travels, the fuel moves inside the fuel tank as a result of a speed change or the hybrid electric vehicle travelling around a bend, whereby the inner side of the battery is cooled.

US 2014 246 259 A1 discloses a battery unit for an electric vehicle, which is fitted to a floor surface of a vehicle floor from below so that the base portion of the battery unit protrudes downward from the vehicle floor. A lower housing which forms a portion of a housing of the battery unit is pressure die-cast from an aluminum alloy together with an upper housing and has a large number of cooling ribs which extend in a vertical direction and which are arranged in a monolithic manner on the front wall and the rear wall of the lower housing. The cooling ribs improve the heat discharge properties and also act as protection for protecting the corners of the base portion of the battery unit in the event of an impact on a curb or the like.

SUMMARY

In an exemplary aspect of the present disclosure, a traction battery is cooled by means of the fuel tank, at least one cooling rib which is arranged in the fuel tank, and fuel which is located in the fuel tank. The fuel tank, the cooling rib and the fuel form a heat sink. The traction battery can be thermally connected to the fuel tank in such a manner that a transfer of heat from the battery cells of the traction battery to the fuel tank is possible with little to no heat resistance. In this instance, the surface of the fuel tank can be used to increase a heat discharge surface-area that is available. In some examples, additional air or liquid cooling is not required so that the cooling of the traction battery can be carried out in a cost-effective manner.

The cooling rib constitutes an increase of the heat-discharging surface of the connection portion of the fuel tank to facilitate removal of the heat away from this connection portion. The cooling rib can consequently absorb heat that has previously been transferred from the traction battery to the connection portion and discharge it from the connection portion of the fuel tank. The cooling rib can transport the heat at least partially to the fuel within the fuel tank. The cooling rib is at least partially immersed in the fuel. To this end, the cooling rib is constructed in such a manner that it extends completely or almost completely as far as a base wall portion of the fuel tank, which is lower than the connection portion and thereby immersed in the fuel in any filling state of the fuel tank.

The cooling rib can be produced partially or completely from a metal, such as, for example, aluminum or copper, or a metal alloy with excellent heat conduction properties. The cooling rib may be produced separately and connected to the connection portion of the fuel tank, for example, in a materially engaging manner or produced in a monolithic manner with the connection portion. In some examples, the assembly has two, three or more corresponding cooling ribs.

In exemplary embodiments, the at least one cooling rib inside the fuel tank can have the advantage of reducing sloshing noises produced as a result of a movement of the fuel inside the fuel tank during travel, which can improves the travel comfort of a corresponding hybrid electric vehicle, particularly since corresponding noises during a calm electrical travel mode of the hybrid electric vehicle would be clearly perceptible.

The connection portion can be the portion of the fuel tank to which the traction battery is physically connected directly or with at least one thermally conductive member or material being interposed. The connection portion can thereby be thermally connected to the traction battery.

In an exemplary embodiment, the fuel tank can be partially or completely formed from a metal sheet in order to enable good heat transmission between the traction battery and the fuel. Such embodiments can be particularly useful with a pressurized fuel system of a hybrid electric vehicle, as is generally the case with a plug-in hybrid electric vehicle. Alternatively, the fuel tank may be partially or completely formed from a plastics material or a composite material.

The traction battery, which is arranged outside the fuel tank and is thermally connected to the fuel tank, has a plurality of battery cells, for example, lithium ion battery cells, which can be combined to form individual battery cell modules. The battery cells may be installed inside a battery housing of the traction battery in such a manner that heat from the battery cells is transmitted directly to the battery housing. To this end, the battery cells can be directly connected to the portion of the battery housing that is connected to the connection portion of the fuel tank.

The traction battery can be connected to the fuel tank in such a manner that a clamping force between the traction battery and the fuel tank is produced in order to ensure a maximum surface contact between the traction battery and the fuel tank to facilitate heat transfer from the traction battery to the fuel tank can be carried out.

In an exemplary embodiment, at least one portion of the cooling rib that is thermally connected to the connection portion of the fuel tank is constructed to be at least partially L-shaped in cross-section, and a member of the portion of the cooling rib is connected to the connection portion in a materially engaging manner. It is thereby possible to produce between the separately produced cooling rib and the connection portion a relatively large connection region in order to be able to rapidly discharge the heat from the connection portion. The member of the portion of the cooling rib that is connected to the connection portion in a materially engaging manner may, for example, be welded or soldered to the connection portion.

In another exemplary embodiment, the cooling rib is at least partially produced from aluminum or copper. Heat can thereby be discharged rapidly from the connection portion by means of the cooling rib and supplied to the fuel.

In another exemplary embodiment, the traction battery is at least partially thermally connected to the fuel tank via a heat-conducting paste or at least one heat distribution plate. The heat transfer between the traction battery and the fuel tank can be facilitated by the heat-conducting paste. To this end, the heat-conducting paste is applied beforehand, for example, in a planar manner, to the traction battery and/or the connection portion of the fuel tank. By means of the heat distribution plate, the heat produced in the battery cells of the traction battery can be better distributed over the entire contact face between the traction battery and the connection portion of the fuel tank, which makes the cooling of the traction battery more uniform and consequently more effective.

In an exemplary embodiment, a hybrid electric vehicle incorporates an assembly having the features of any one of the above-mentioned embodiments or any combination of at least two of these embodiments with each other.

The advantages mentioned above with regard to the assembly can accordingly be connected with a vehicle, in particular a hybrid electric vehicle. The vehicle, in particular the hybrid electric vehicle, may, for example, be a plug-in hybrid electric vehicle. The hybrid electric vehicle can have at least one internal combustion engine that can be supplied with fuel from the fuel tank by means of the fuel pump.

Although embodiments of this disclosure are been described in particular with reference to hybrid vehicles, purely electric vehicles are also included within the scope of this disclosure. Although electric vehicles have no internal combustion engine for driving the vehicle, they may have fuel-operated units, such as, for example, fuel-operated auxiliary heating systems. These electric vehicles can have a fuel tank that stores the fuel for the fuel-operated units. This fuel tank of the purely electric vehicle or the fuel stored in the fuel tank may as described above be used for cooling the battery as necessary by the above-described advantageous arrangement and configuration of the fuel tank being used.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to an assembly for a vehicle, in particular for a hybrid vehicle. The assembly has at least one cooling rib arranged inside the fuel tank. The cooling rib is thermally connected to a connection portion of the fuel tank, which is thermally connected to the traction battery and is constructed in such a manner that it extends almost completely or completely as far as a base wall portion of the fuel tank. The base wall can be arranged to be vertically lower than the connection portion. Vertical for purposes of this disclosure refers to the general orientation of the vehicle during operation and with reference to ground or the horizon.

The features and measures set out individually in the following description can be combined with each other in any technically advantageous manner to provide other embodiments of the present disclosure.

Figure 1:
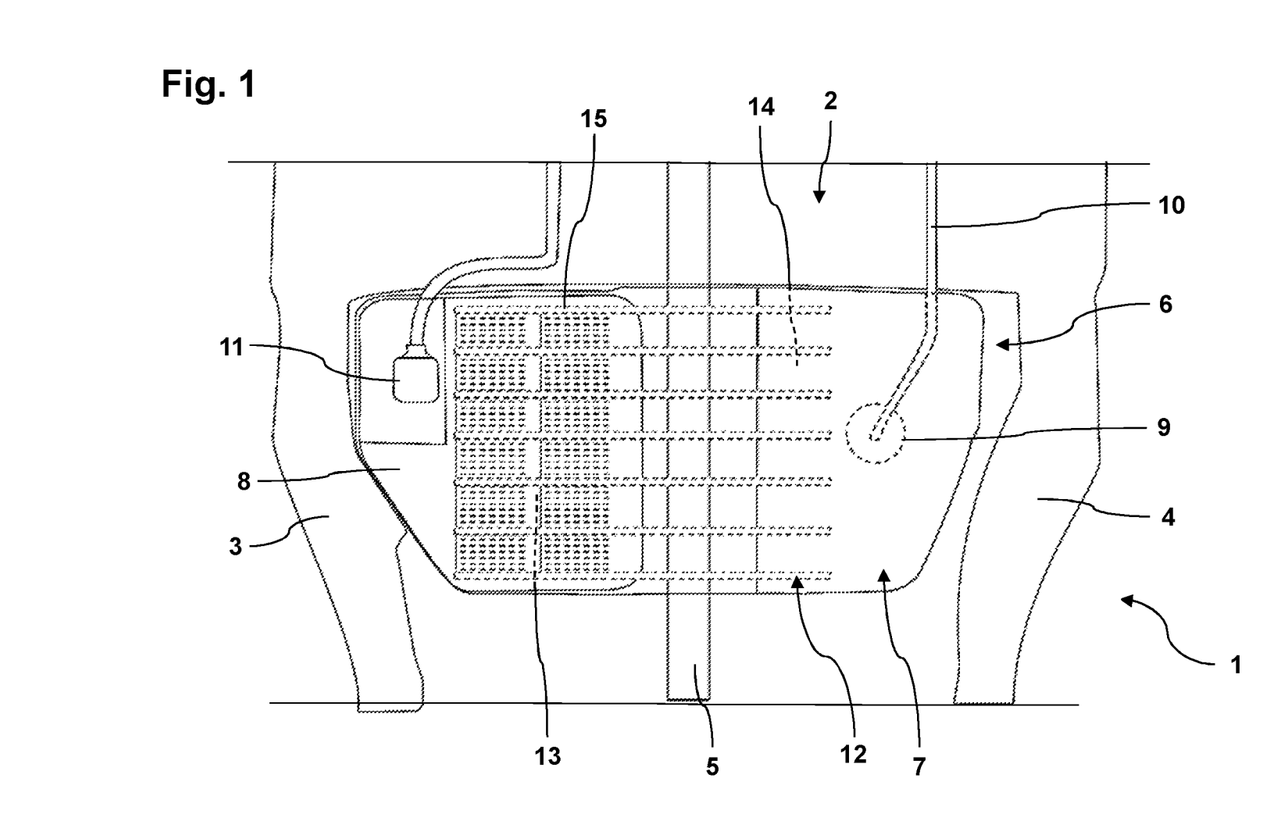
FIG. 1 illustrates a schematic bottom view of a rear end portion of a hybrid electric vehicle according to an embodiment of the present disclosure.

FIG. 1 is a schematic bottom view of a rear end portion of an embodiment of a vehicle according to an embodiment of the present disclosure. The vehicle can be a hybrid electric vehicle 1. The hybrid electric vehicle 1 has a lower base 2 having two lateral side carriers 3 and 4. A portion of an exhaust pipe 5 which extends in the longitudinal direction of the vehicle is additionally shown.

The hybrid electric vehicle 1 has an assembly 6 that includes a fuel tank 7 and a traction battery 8. The traction battery 8 is arranged outside the fuel tank 7 and is thermally connected to the fuel tank 7. The traction battery 8 may at least partially be thermally connected to the fuel tank 7 by means of a heat-conducting paste, which is not shown.

A fuel pump 9 is arranged in the fuel tank 7. A fuel supply line 10 is connected to the pressure side of the fuel pump 9.

The fuel supply line 10 is used to supply an internal combustion engine (not shown) of the hybrid electric vehicle 1 with fuel. The traction battery 8 is connected by means of a battery connection 11 to additional electrical components of the hybrid electric vehicle 1 which are not shown. The fuel tank 7 has in the region of the traction battery 8 and the exhaust pipe 5 a reduced height which can be seen in particular in FIGS. 2 and 4.

The exemplary assembly 6 has seven cooling ribs 12 which are arranged inside the fuel tank 7 and which are each thermally connected to a connection portion 13 of the fuel tank 7. The connection portion 13 of the fuel tank 7 is thermally connected to the traction battery 8.

Each cooling rib 12 may be at least partially produced from aluminum or copper. The cooling ribs 12 are indicated only schematically in FIG. 1 by broken lines since they are arranged in a state concealed within the fuel tank 7. The structure of the cooling ribs 12 can be better seen in FIGS. 2 to 4.

The cooling ribs 12 extend parallel with each other and are arranged spaced apart from each other. Each cooling rib 12 is constructed in such a manner that it extends completely as far as a base wall portion 14 of the fuel tank 7, which is arranged vertically lower than the connection portion 13. This can better be seen in particular in FIGS. 2 and 4.

Figure 3:
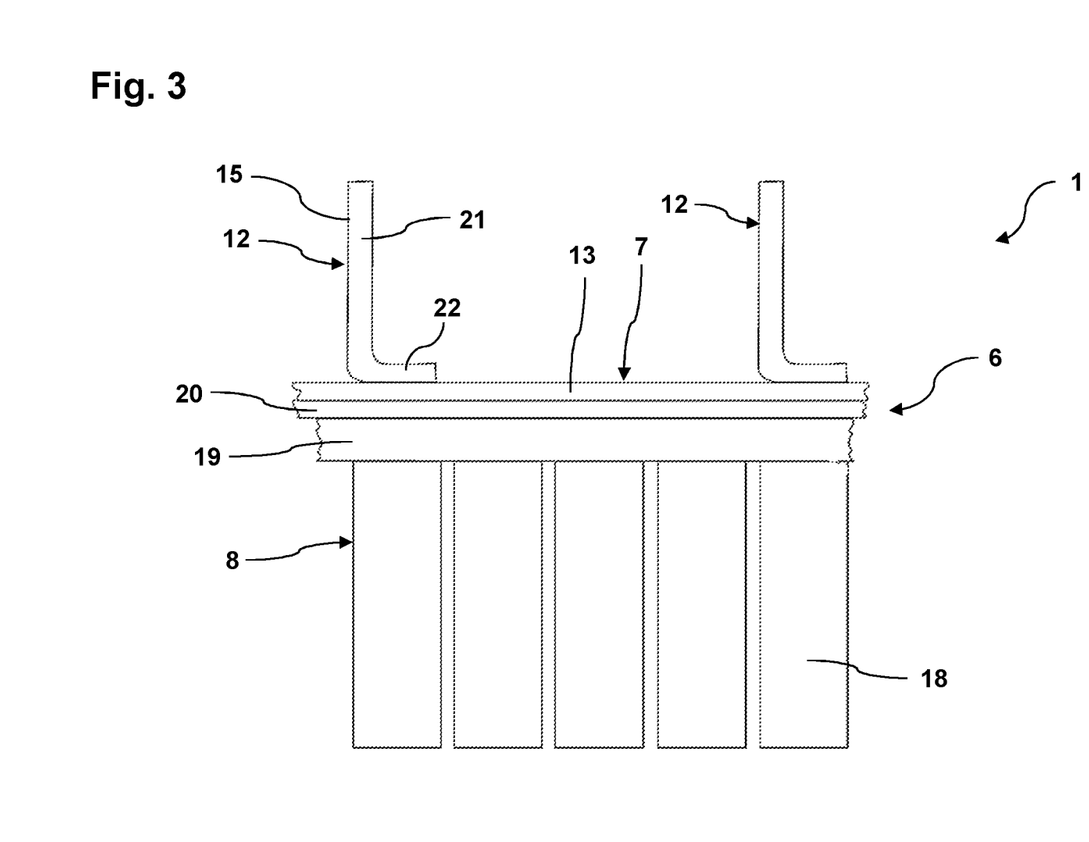
FIG. 3 illustrates another schematic sectioned illustration of the hybrid electric vehicle of FIG. 1.

At least one portion 15 of the respective cooling rib 12, which is thermally connected to the connection portion 13 of the fuel tank 7, is at least partially constructed to be L-shaped in cross-section, As shown in FIG. 3, a member of the respective portion 15 of the cooling rib 12 is connected to the connection portion 13 in a materially engaging manner.

Figure 2:
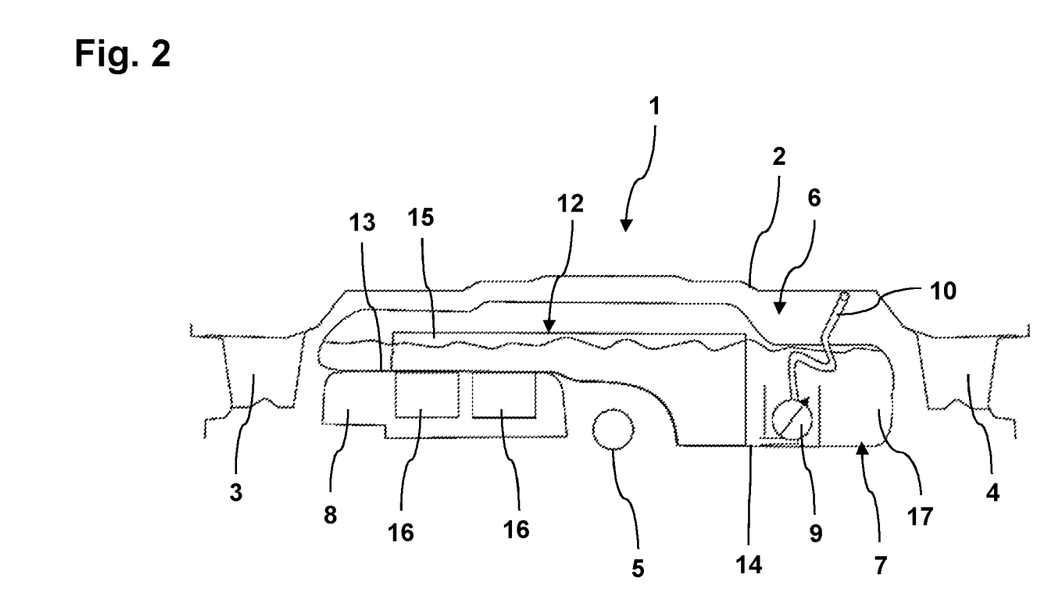
FIG. 2 illustrates a schematic sectioned view of the hybrid electric vehicle of FIG. 1.

FIG. 2 illustrates a schematic sectioned illustration of the hybrid electric vehicle 1 shown in FIG. 1. In the different Figures, identical components are always provided with the same reference numerals, for which reason they are generally also only described once.

In FIG. 2, it can be seen how the cooling rib 12 extends in the transverse direction of the vehicle through the fuel tank 7, from the connection portion 13 of the fuel tank 7 to the base wall portion 14 of the fuel tank 7 which is arranged vertically lower than the connection portion 13. There is additionally shown inside the fuel tank 7 a fuel 17 in which the cooling rib 12 shown is almost completely immersed. Of the traction battery 8, two battery cell modules 16 can be seen.

FIG. 3 is another schematic sectioned illustration of the hybrid electric vehicle 1 shown in FIG. 1 in the region of the connection portion 13 of the fuel tank 7. It is possible to see the structure of the traction battery 8, which has a plurality of battery cells 18 that are directly thermally and physically connected to a heat distribution plate 19 of the traction battery 8 which in turn is directly thermally and physically connected to a battery housing 20 of the traction battery 8. The battery housing 20 is thermally connected to the connection portion 13.

The portion 15 of each cooling rib 12 that is thermally connected to the connection portion 13 of the fuel tank 7 is constructed at least partially to be L-shaped in cross-section. The respective portion 15 has a member 21 that extends perpendicularly to the connection portion 13 and a member 22 that is connected to the connection portion 13 in a materially engaging manner and which extends parallel with the connection portion 13.

Figure 4:
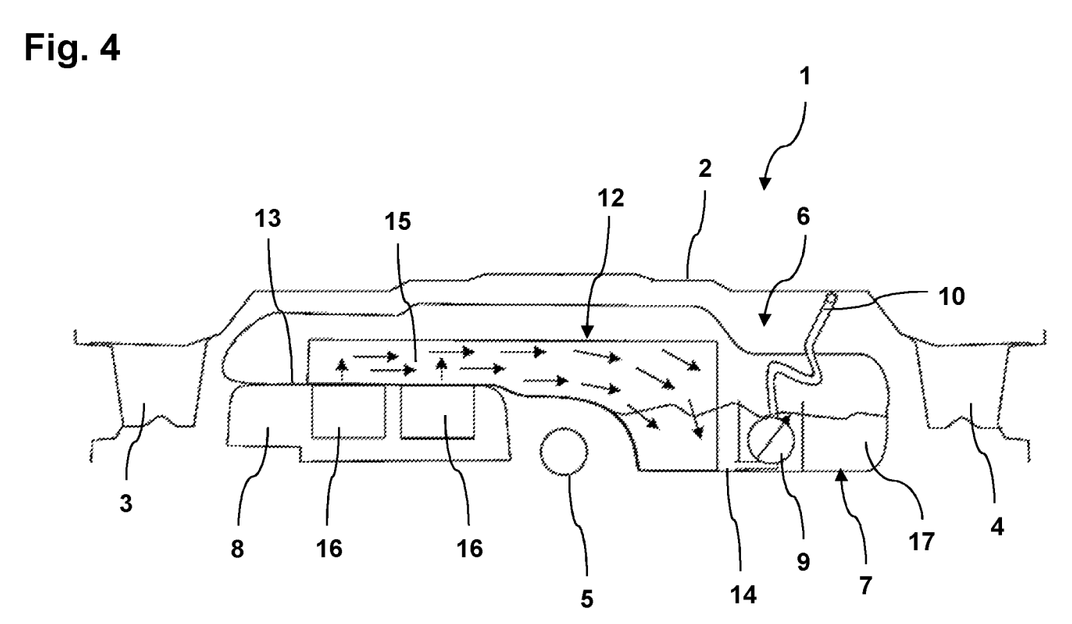
FIG. 4 illustrates another schematic sectioned illustration of the hybrid electric vehicle of FIG. 1, but with a tank filling state different from that shown in FIG. 2.

FIG. 4 is another schematic sectioned illustration of the hybrid electric vehicle 1 shown in FIG. 1 with a tank filling state different from FIG. 2. The fuel 17 is in the tank filling state shown almost used up so that the respective cooling rib 12 is free to the greatest possible extent, but with the end portion thereof which is adjacent to the base wall portion 14 of the fuel tank 7 which is arranged to be vertically lower than the connection portion 13 still being immersed in the fuel 17. The heat transfer from the connection portion 13 via the cooling rib 12 to the fuel 17 is indicated by arrows.

Figure 5:
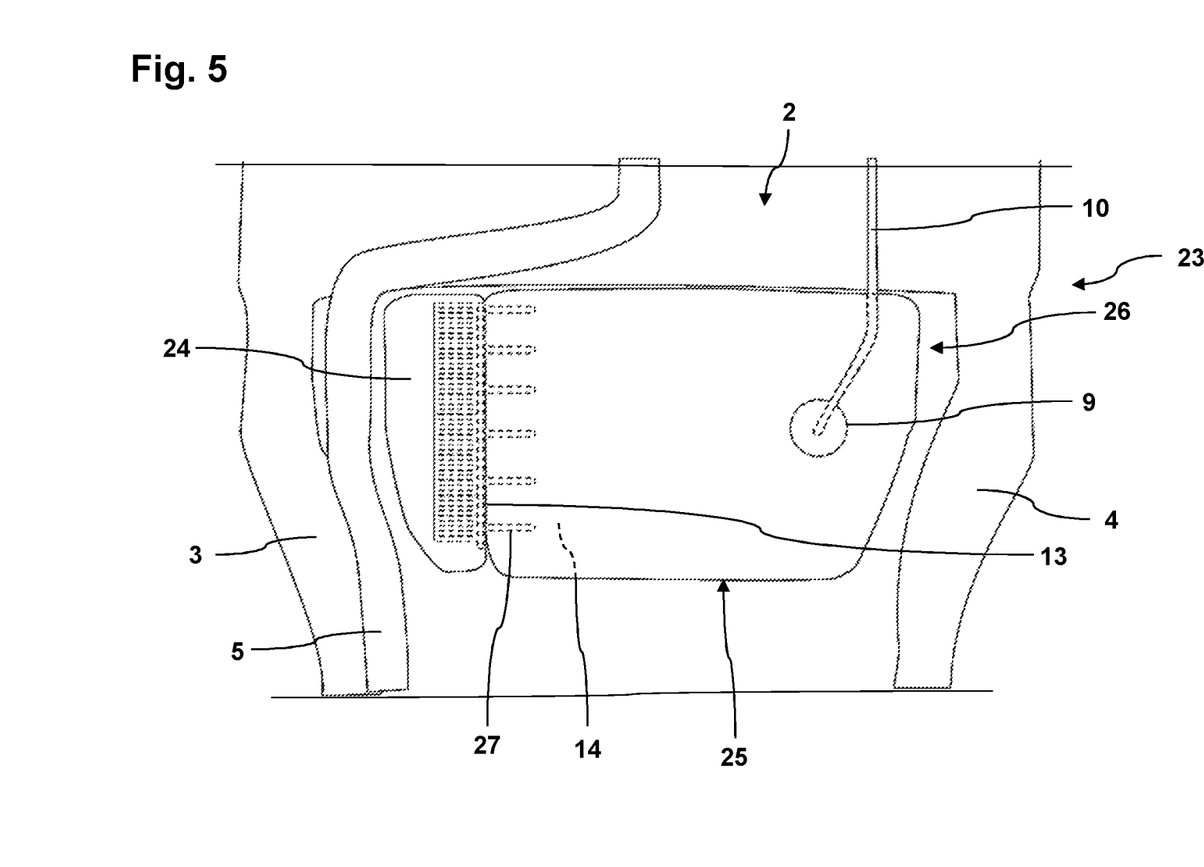
FIG. 5 illustrates a schematic bottom view of a rear end portion of a hybrid electric vehicle according to another exemplary embodiment of the present disclosure.

FIG. 5 is a schematic bottom view of a rear end portion of another embodiment of a hybrid electric vehicle 23 according to another exemplary aspect of the present disclosure. The hybrid electric vehicle 23 differs from the embodiment shown in FIGS. 1 to 4 in particular in that the traction battery 24 is arranged laterally beside the fuel tank 25, for which purpose the exhaust pipe 5 has been displaced laterally and laid around the assembly 26. The connection portion 13 of the fuel tank 25 extends vertically. The same applies to the six cooling ribs 27 which are thermally connected to the connection portion 13 and which, as a result of their concealed arrangement inside the fuel tank 25, are indicated with broken lines. The structure of the assembly 26 can be seen well in FIG. 6. Each cooling rib 27 may be constructed to be completely L-shaped and may have a member which extends parallel with the connection portion 13, which is not shown, and which is connected to the connection portion 13 in a materially engaging manner. In order to prevent repetition, reference may further be made to the above description in relation to FIGS. 1 to 4.

Figure 6:
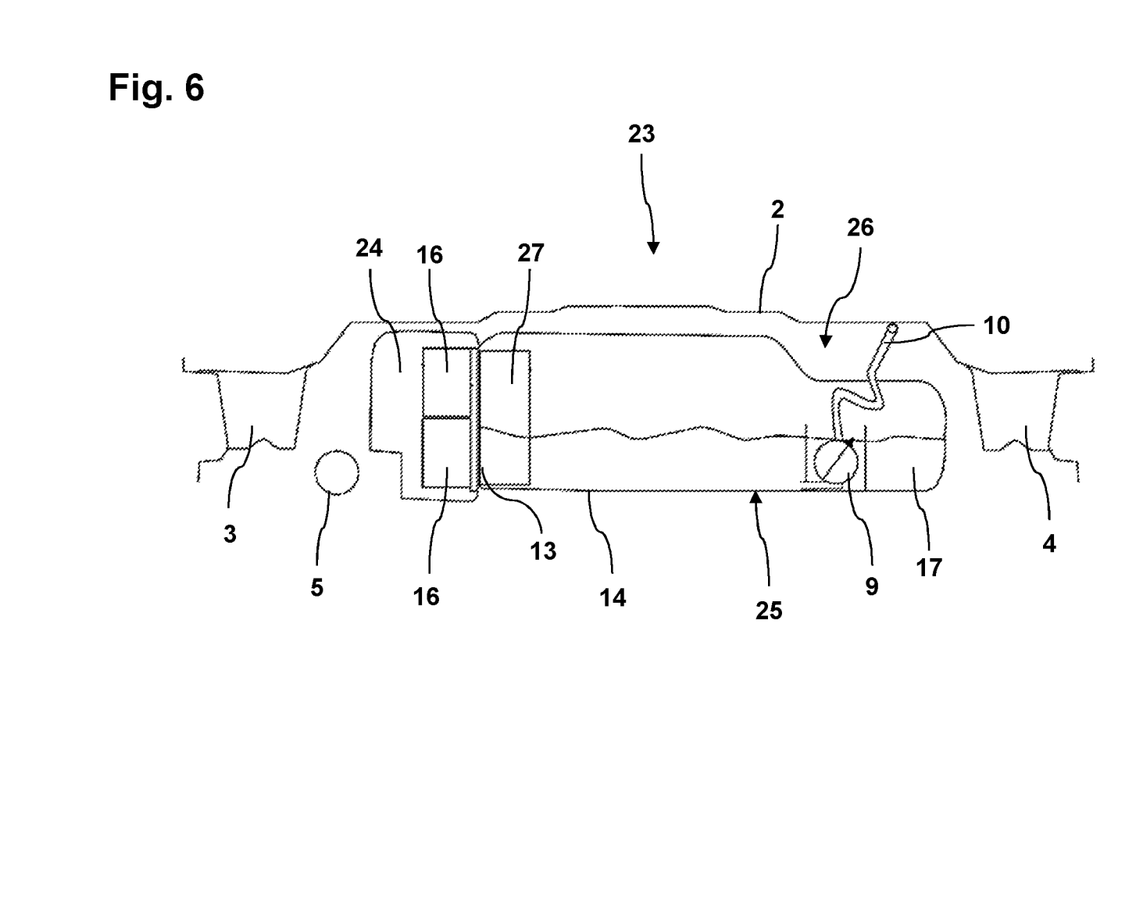
FIG. 6 illustrates a schematic sectioned illustration of the hybrid electric vehicle shown in FIG. 5.

FIG. 6 is a schematic sectioned illustration of the hybrid electric vehicle 23 shown in FIG. 5. It can be seen that each cooling rib 27 is immersed in the fuel 17 inside the fuel tank 25 and, in the tank filling state shown, only with a geodetically lower end portion.

Although exemplary embodiments of this disclosure are described in particular with reference to hybrid vehicles, purely electric vehicles are also included within the scope of this disclosure. Although purely electric vehicles may have no internal combustion engine for driving the vehicle, they may have fuel-operated units, such as, for example, fuel-operated auxiliary heating systems. These electric vehicles naturally have in this regard a fuel tank which stores the fuel for the fuel-operated units. This fuel tank of the purely electric vehicle or the fuel which is stored in the fuel tank can be used as described above for cooling the battery as required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly for a vehicle, comprising:
   at least one fuel tank;
   at least one traction battery arranged outside the fuel tank thermally connected to the fuel tank; and
   at least one cooling rib arranged inside the fuel tank and thermally connected to a connection portion of the fuel tank, the connection portion thermally connected to the traction battery, the at least one cooling rib constructed to extend almost completely or completely as far as a base wall portion of the fuel tank, the base wall portion arranged vertically lower than the connection portion.

2. The assembly of claim 1, wherein at least one portion of the cooling rib, which is thermally connected to the connection portion of the fuel tank, is constructed to be at least partially L-shaped in cross-section, wherein a member of the portion of the cooling rib is connected to the connection portion in a materially engaging manner.

3. The assembly of claim 1, wherein the traction battery is at least partially thermally connected to the fuel tank via a heat-conducting paste.

4. The assembly of claim 1, wherein the traction battery is at least partially thermally connected to the fuel tank via at least one heat distribution plate.

5. The assembly of claim 1, wherein the at least one cooling rib is directly connected to the connection portion and directly connected to the base wall portion such that the at least one cooling rib extends from the connection portion to the base wall portion.

6. The assembly of claim 1, wherein the at least one traction battery is directly connected to the connection portion of the fuel tank, and the at least one traction battery is spaced a distance from the base wall portion of the fuel tank.

7. The assembly of claim 1, wherein the battery is vertically beneath a portion of the fuel tank.

8. An assembly for a vehicle, comprising:
at least one fuel tank;
at least one traction battery arranged outside the fuel tank, the at least one traction battery thermally connected to the fuel tank; and
at least one cooling rib arranged inside the fuel tank and thermally connected to a connection portion of the fuel tank, the connection portion thermally connected to the traction battery, the at least one cooling rib constructed to extend to a base wall portion of the fuel tank, the base wall portion arranged vertically lower than the connection portion.

9. The assembly of claim 8, wherein the vehicle is a hybrid electric vehicle.

10. The assembly of claim 8, wherein at least one portion of the cooling rib, which is thermally connected to the connection portion of the fuel tank, is constructed to be at least partially L-shaped in cross-section, wherein a member of the portion of the cooling rib is connected to the connection portion in a materially engaging manner.

11. The assembly of claim 8, wherein the cooling rib is at least partially produced from aluminum or copper.

12. The assembly of claim 8, wherein the traction battery is at least partially thermally connected to the fuel tank via a heat-conducting paste.

13. The assembly of claim 8, wherein the traction battery is at least partially thermally connected to the fuel tank via at least one heat distribution plate.

14. The assembly of claim 8, wherein the at least one cooling rib is directly connected to the connection portion and directly connected to the base wall portion such that the at least one cooling rib extends from the connection portion to the base wall portion.

15. The assembly of claim 8, wherein the at least one traction battery is directly connected to the connection portion of the fuel tank, and the at least one traction battery is spaced a distance from the base wall portion of the fuel tank.

16. The assembly of claim 8, wherein the at least one traction battery is thermally connected to the connection portion of the fuel tank, and the at least one traction battery is spaced a distance from the base wall portion of the fuel tank.

17. The assembly of claim 8, wherein the battery is vertically beneath a portion of the fuel tank.

18. The assembly of claim 8, wherein the at least one traction battery and the fuel tank are directly thermally connected to each other, wherein the at least one traction battery and the fuel tank are both disposed vertically beneath a lower base of a hybrid electric vehicle.

19. A traction battery thermal management method, comprising:
thermally connecting a traction battery to a connection portion of a fuel tank, the traction battery outside the fuel tank;
using at least one cooling rib arranged inside the fuel tank to thermally connect the connection portion of the fuel tank to a base wall portion of the fuel tank, the base wall portion arranged vertically lower than the connection portion.

20. The method of claim 19, wherein the at least one cooling rib extends from the connection portion to the base wall portion.

* * * * *